US010954396B2

(12) United States Patent
Takeda et al.

(10) Patent No.: US 10,954,396 B2
(45) Date of Patent: Mar. 23, 2021

(54) PASTE CONTAINING NICKEL NANOWIRES

(71) Applicant: UNITIKA LTD., Amagasaki (JP)

(72) Inventors: Hirotaka Takeda, Uji (JP); Chikako Yamada, Uji (JP)

(73) Assignee: UNITIKA LTD., Amagasaki (JP)

( * ) Notice: Subject to any disclaimer, the term of this patent is extended or adjusted under 35 U.S.C. 154(b) by 0 days.

(21) Appl. No.: 16/753,569

(22) PCT Filed: Oct. 1, 2018

(86) PCT No.: PCT/JP2018/036635
§ 371 (c)(1),
(2) Date: Apr. 3, 2020

(87) PCT Pub. No.: WO2019/073833
PCT Pub. Date: Apr. 18, 2019

(65) Prior Publication Data
US 2020/0291247 A1 Sep. 17, 2020

(30) Foreign Application Priority Data

Oct. 13, 2017 (JP) .............................. JP2017-199553
Jul. 20, 2018 (JP) .............................. JP2018-137125

(51) Int. Cl.
C09D 5/24 (2006.01)
C09D 7/40 (2018.01)
C09D 7/20 (2018.01)
H01B 1/22 (2006.01)
B22F 1/00 (2006.01)
C09D 177/00 (2006.01)
C08K 7/06 (2006.01)
C08K 3/08 (2006.01)

(52) U.S. Cl.
CPC .............. C09D 5/24 (2013.01); B22F 1/0059 (2013.01); B22F 1/0062 (2013.01); C09D 7/20 (2018.01); C09D 7/70 (2018.01); C09D 177/00 (2013.01); H01B 1/22 (2013.01); B22F 1/0007 (2013.01); B22F 2301/15 (2013.01); B22F 2304/10 (2013.01); C08K 7/06 (2013.01); C08K 2003/0862 (2013.01); C08K 2201/001 (2013.01); C08K 2201/004 (2013.01); C08K 2201/011 (2013.01)

(58) Field of Classification Search
CPC .... C08K 7/06; C08K 3/08; C08K 2003/0862; C08K 2201/001; C08K 2201/004
See application file for complete search history.

(56) References Cited

U.S. PATENT DOCUMENTS 5,075,189 A * 12/1991 Ichino .................. G03G 5/0679
430/58.4
9,150,746 B1 10/2015 Li et al.
9,183,968 B1 11/2015 Li et al.
2007/0074316 A1* 3/2007 Alden .................... B82Y 30/00
257/784
2010/0104316 A1 4/2010 Hoshio et al.
2011/0168957 A1 7/2011 Lonjon et al.
2014/0124713 A1* 5/2014 Majumdar .............. H01L 29/45
252/513
2014/0134041 A1* 5/2014 Hotta ...................... C09D 7/61
420/441
2014/0183421 A1* 7/2014 Lockett ................ C09D 11/037
252/513
2015/0056382 A1 2/2015 Suganuma et al.
2015/0144380 A1 5/2015 Yang et al.
2016/0032127 A1 2/2016 Li et al.
2016/0369118 A1 12/2016 Li et al.
2017/0047150 A1 2/2017 Takeda et al.

FOREIGN PATENT DOCUMENTS

| JP | 2005-122930 A | 5/2005 |
|---|---|---|
| JP | 2010-102197 A | 5/2010 |
| JP | 2011-70968 A | 4/2011 |
| JP | 2011-529617 A | 12/2011 |
| JP | 2016-11431 A | 1/2016 |
| JP | 2017-505509 A | 2/2017 |
| JP | 2017-529419 A | 10/2017 |
| WO | WO 2010/012935 A2 | 2/2010 |
| WO | WO 2013/161996 A2 | 10/2013 |
| WO | WO 2015/077145 A2 | 5/2015 |
| WO | WO 2015/163258 A1 | 10/2015 |
| WO | WO 2016/018792 A1 | 2/2016 |
| WO | WO 2017/159537 A1 | 9/2017 |

OTHER PUBLICATIONS

English translation of the Written Opinion for International Application No. PCT/JP2018/036635, dated Dec. 25, 2018.
Extended European Search Report for European Application No. 18366682.0, dated Oct. 21, 2020.
International Search Report, issued in PCT/JP2018/036635, dated Dec. 25, 2018.

* cited by examiner

Primary Examiner — Katie L. Hammer

(74) Attorney, Agent, or Firm — Birch, Stewart, Kolasch & Birch, LLP

(57) ABSTRACT

The present invention provides a nickel nanowires-containing paste having an adequately high thermal curing rate even under comparatively low temperature, which is excellent in functional properties such as an electrical conductivity, strength properties (in particular, a bending property), a water-resisting property, a salt water-resisting property and electromagnetic-wave shielding properties, from which a cured structure excellent in an electrical conductivity can be obtained even if it is stored for a long time. The present invention relates to a paste comprising nickel nanowires, an alkoxy-alkylated polyamide and a glycol.

15 Claims, No Drawings

PASTE CONTAINING NICKEL NANOWIRES

TECHNICAL FIELD

The present invention relates to a paste containing nickel nanowires.

BACKGROUND ART

Utilization of nanowires as a nanotechnology material in a variety of fields is being studied, and for example, employment of the nanowires in a fine wiring of an electronic material, a sensor, a solar battery etc. is expected. As the electronic material, an epoxy resin is general as a binder that binds electrically conductive materials. However, in recent years, from a viewpoint of curing on a flexible polymer substrate and energy saving, curing at a lower temperature has been demanded, but since the epoxy resin has a high thermal curing temperature, and is limited in use, one having a high thermal curing rate even under comparatively low temperature has been required.

Moreover, since silver nanowires widely known as nanowires are made of a noble metal, the cost is very high, and ion migration easily occurs. Since copper nanowires that are known next to the silver nanowires are apt to rust, there is a problem that they cannot be formulated into a dispersion such as a paste, or are bad in a durability as a dispersion. For this reason, both nanowires have been limited in practical use.

The present inventors disclosed nickel nanowires as nanowires that have a high ion migration-resisting property, and are difficult to rust (for example, Patent Literature 1 etc.). However, since the nickel nanowires react with oxygen in the air or the liquid to form a passive layer on the surface, there has been a problem that even when the nickel nanowires are incorporated into a structure as it is, a sufficient electrical conductivity is not obtained in an electric wiring etc.

Meanwhile, a method of obtaining a sufficient electrical conductivity by reducing nickel nanowires themselves has been disclosed as in Patent Literature 2. However, in a structure of the nickel nanowires obtained by such a method, there have been a variety of problems, such as that it is brittle, generates gaps due to cracking etc., and is unsuitable in utility in which it is made to function as a plane, such as electromagnetic-wave shielding.

For example, when a polymer that dissolves in a glycol, such as polyvinylpyrrolidone, is added as a binder, the binder dissolves in a solvent such as water and an alcohol having a high polarity like a glycol. Therefore, a structure obtained from a paste containing nickel nanowires, a binder and a glycol could not be used outdoors or in water that requires a water-resisting (sea water) or for medical applications that are sterilized with a chemical solution such as an alcohol is performed, or the like. For this reason, in the structure, a special protective layer that is high in a water-resisting property and an alcohol-resisting property, and is low in a water permeability and an alcohol permeability has been required.

Furthermore, for example, when a monomer or a polymer having a curing property, which contains an epoxy group or an isocyanate group etc., is added as a binder, since glycols have a high boiling point and, further, have active hydrogens, it is difficult to control a curing reaction thereof, and the binder incorporates a glycol partially and cures. For this reason, a paste containing nickel nanowires, a curable binder and a glycol has had a problem that a structure after curing is brittle, a shape cannot be maintained, contact between nanowires cannot be secured to show an electrical conductivity and electromagnetic-wave shielding properties, and so on.

CITATIONS LIST

Patent Literature

Patent Literature 1: International Publication WO 2015/163258

Patent Literature 2: JP-A-2016-11431

SUMMARY OF INVENTION

Problems to be Solved by the Invention

The present invention solves the above-mentioned problems, and an object thereof is to provide nickel nanowires-containing paste having an adequately high thermal curing rate even under comparatively low temperature, which is excellent in functional properties such as an electrical conductivity, strength properties (in particular, a bending property), a water-resisting property, a salt water-resisting property and electromagnetic-wave shielding properties, from which a cured structure excellent in an electrical conductivity can be obtained even if it is stored for a long time.

Also, an object of the present invention is to provide a nickel nanowires-containing paste having an adequately high thermal curing rate even under comparatively low temperature, which is excellent in functional properties such as an electrical conductivity, strength properties (in particular, a bending property), a water-resisting property, a salt water-resisting property, an alcohol-resisting property and electromagnetic-wave shielding properties, from which a cured structure excellent in an electrical conductivity can be obtained even if it is stored for a long time.

Means for Solving Problems

The present inventors intensively made a study in order to solve such problems, and as a result, found out that the above-mentioned object is attained by using an alkoxy-alkylated polyamide and a glycol together with nickel nanowires, arriving at the present invention.

That is, a subject matter of the present invention is as follows:

(1) A paste comprising nickel nanowires, an alkoxy-alkylated polyamide and a glycol.

(2) The paste of (1), wherein the content of the nickel nanowires is 1 to 50% by mass based on the total amount of the paste.

(3) The paste of (1) or (2), wherein an average length of the nickel nanowires is 5 to 40 μm.

(4) The paste of any one of (1) to (3), wherein the alkoxy-alkylated polyamide is a polyamide in which hydrogen atoms of at least a part of amide groups are substituted with an alkyl group having an alkoxy group, the carbon atom number of the alkoxy group is 1 to 5, and the carbon atom number of the alkyl group is 1 to 5.

(5) The paste of any one of (1) to (4), wherein the content of the alkoxy-alkylated polyamide is 1 part by mass or more based on 100 parts by mass of the nickel nanowires.

(6) The paste of any one of (1) to (5), wherein the content of the alkoxy-alkylated polyamide is 10% by mass or less based on the total amount of the paste.

(7) The paste of any one of (1) to (6), wherein the glycol is selected from the group consisting of ethylene glycol, propylene glycol, trimethylene glycol, diethylene glycol, dipropylene glycol, triethylene glycol and tripropylene glycol.
(8) The paste of any one of (1) to (7), wherein the content of the glycol is 40 to 98.9% by mass based on the total amount of the paste.
(9) The paste of any one of (1) to (8), further comprising an acid catalyst.
(10) The paste of (9), wherein the acid catalyst is oxalic acid.
(11) The paste of (9) or (10), wherein the content of the acid catalyst is 1 to 10 parts by mass based on 100 parts by mass of the alkoxy-alkylated polyamide.
(12) The paste of any one of (1) to (11), further comprising glycol alkyl ether.
(13) The paste of (12), wherein the glycol alkyl ether is one or more glycol derivatives selected from the group consisting of glycol derivatives in which at least one hydroxy group of two hydroxy groups of ethylene glycol or propylene glycol is alkyl-etherized, and an alkyl group of the alkyl ether is an alkyl group having 1 to 5 carbon atoms.
(14) The paste of (12) or (13), wherein the content of the glycol alkyl ether is 1 to 150 parts by mass based on 100 parts by mass of the glycol.
(15) A structure that is obtained by curing the paste according to any one of (1) to (14) at 130 to 160° C.

Effects of the Invention

According to the nickel nanowires-containing paste of the present invention, there can be obtained a cured structure having an adequately high curing rate even under comparatively low temperature, which is excellent in functional properties such as an electrical conductivity, strength properties (in particular, a bending property), a water-resisting property, a salt water-resisting property and electromagnetic-wave shielding properties.

According to the nickel nanowires-containing paste of the present invention, there can be obtained a cured structure that is excellent in an electrical conductivity even if it is stored for a long time.

Since the paste of the present invention can be applied and bonded to a plastic having a low heat-resisting property, the paste can be used as a material constituting a wiring and an electrode having a flexible property, and can also be suitably used in a device such as a sensor.

MODES FOR CARRYING OUT THE INVENTION

The paste of the present invention contains nickel nanowires, an alkoxy-alkylated polyamide and a glycol.

The nickel nanowires are not particularly limited, as long as they are nanowires composed of nickel.

An average diameter of the nickel nanowires is not particularly limited, but is usually 50 to 500 nm, preferably 50 to 300 nm. When the nickel nanowires are prepared by a chemical reducing method described later, an average diameter thereof is usually around 30 nm to 200 nm, and from a viewpoint of a dispersibility in the paste and an electrical conductivity of a cured structure, an average diameter is preferably around 70 nm to 120 nm. In the present description, the cured structure is a structure that can be formed by curing the paste, and examples thereof include a wiring layer, an electrode layer, and an electromagnetic-wave shielding layer.

An average length of the nickel nanowires is not particularly limited. When the nickel nanowires are prepared by a chemical reducing method described later, an average length thereof is around 5 μm to 50 μm, particularly around 5 to 40 μm, and from a viewpoint of further improvement in an electrical conductivity, an alcohol-resisting property and electromagnetic-wave shielding properties of the cured structure, the longer would be better, 10 μm or more is preferable, and 15 μm or more (in particular, 15 to 40 μm) is particularly preferable.

An aspect ratio (average length/average diameter) of the nickel nanowires is usually 10 to 2000, preferably 200 to 500, more preferably 200 to 400.

The content of the nickel nanowires is not particularly limited, but from a viewpoint of a fluidity of the paste and prevention of cutting of the nanowires, is preferably 1 to 50% by mass, and from a storage stability of the paste, is preferably 40% by mass or less, particularly preferably 1 to 40% by mass based on the total amount of the paste. Furthermore, from a viewpoint of a mixing property and a dispersibility of a binder and a solvent as well as further improvement in an alcohol-resisting property of the cured structure, the content of the nickel nanowires is preferably 10% by mass or less, particularly 1 to 10% by mass, more preferably 5% by mass or less, particularly 1 to 5% by mass based on the total amount of the paste. By selecting 1 to 5% by mass as the content, the paste can be applied on further various products, and in a structure obtained by curing, there are much less gaps, and an electrical conductivity and the like are further improved.

A method of manufacturing the nickel nanowires is not particularly limited, but the nickel nanowires can be manufactured, for example, by a known chemical reducing method, or a wetting method such as an electrodeposition method, or the like. When an affinity between the glycol used in the paste is considered, preferable nickel nanowires are nickel nanowires manufactured by the chemical reducing method. A further preferable nickel nanowires are nickel nanowires manufactured by reducing nickel ions in the glycol. An example of the manufacturing method will be shown below.

Nickel ions that are to be a raw material of the chemical reducing method are not particularly limited. Examples thereof include sulfate, nitrate, hydrochloride, acetate and the like of nickel. These salts may be a hydrate or an anhydrate.

The concentration of nickel ions to be reduced is not particularly limited, but from a viewpoint of controlling a shape of the nanowire, the concentration is preferably 10 to 20 μmol/g, more preferably around 15 to 20 μmol/g based on the total amount of a reaction solution. When the concentration of nickel ions is 20 μmol/g or less, it becomes possible to suppress generation of three-dimensional aggregation of the nanowires (production of a non-woven fabric form). When the concentration of nickel ions is low, the production efficiency becomes bad.

A method of reducing nickel ions is not particularly limited, but from a viewpoint of a compatibility with a solvent, a reducing power, removal of a reducing agent etc., a reducing method with hydrazine monohydrate is preferable. Furthermore, by reduction with hydrazine monohydrate, it becomes possible to manufacture nickel nanowires of a high purity not containing phosphorus and boron.

The addition concentration of hydrazine monohydrate is usually 0.05 to 0.5% by mass based on a reaction solution. When the addition concentration is less than 0.05%, reduction is inefficient, and an objective nanowire shape (e.g.

average length and average diameter described later) is not obtained in some cases. When the addition concentration exceeds 0.5%, nanowires aggregate and become a non-woven fabric-like in some cases.

In order to control a shape of the nanowire, a complexing agent can also be added. As the complexing, one having a complexation constant with nickel at room temperature of around 4 is preferable. In the case of one having a high complexation constant, a complex is stabilized, and becomes difficult to contribute to a reaction. In the case of one having a low complexation constant, influence on shape control is lost in some cases. The complexing agent having a complexation constant of around 4 is, for example, citric acid, succinic acid etc.

When an amount of the complexing agent is small, the nanowire tends to become thick, and when the amount is large, the nanowire tends to becomes thin, or the yield tends to reduce. For that reason, an addition amount of the complexing agent is preferably 0.1 µmol/g or more and 2 µmol/g or less.

A nucleating agent such as platinum, which becomes a catalyst of reduction of nickel ions can also be added. However, since even when the nucleating agent is not added, the nanowires can be manufactured, usually, the nucleating agent may not be added. Addition of the nucleating agent increases the cost.

In order to reduce nickel ions, it is necessary that a pH of the solution is 10 or higher and 12 or lower. For adjusting a pH, it is preferable to use sodium hydroxide having no volatility.

As a reaction solvent, polyols such as ethylene glycol and propylene glycol are preferable. When the reaction solvent is polyols, since a raw material such as a nickel salt, and a reducing agent can be dissolved, and further, boiling does not occur even at a reaction temperature, a reproducible reaction becomes possible.

In order to reduce nickel ions, it is preferable that a temperature is 80° C. or higher and lower than 100° C. By selecting this temperature region, a reducing rate can be made to be proper, and volatilization of a reducing agent can be decreased.

It is preferable that reduction of nickel ions is performed in a magnetic field or in a magnetic circuit. It is preferable that the intensity of a magnetic field, a magnetic flux density is around 150 mT. When a magnetic field is weak, the nanowires are difficult to be produced. Additionally, since it is difficult to generate a strong magnetic field, this is not practical.

A reducing reaction time is not particularly limited, but for example, is 3 minutes to 1 hour, preferably 3 minutes to 20 minutes. Thereafter, by purifying and recovering the nanowires by centrifugation, filtration, adsorption with a magnet etc., nickel nanowires can be obtained.

For the purpose of immobilizing the nickel nanowires, it is necessary that the paste of the present invention contains an alkoxy-alkylated polyamide. The alkoxy-alkylated polyamide is one in which an alkoxyalkyl group is introduced into at least a part of (usually, a part of) nitrogens of amide groups of a polyamide. For details, the alkoxy-alkylated polyamide is a polyamide in which hydrogen atoms of at least a part of (usually, a part of) amide groups are substituted with an alkyl group having an alkoxy group (i.e. alkoxyalkyl group) (i.e. N-alkoxyalkylpolyamide). The carbon atom number of the alkoxy group is usually 1 to 5, preferably 1 to 3. Specific examples of the alkoxy group include a methoxy group, an ethoxy group, a propoxy group, a butoxy group, and a pentyloxy group etc. The carbon atom number of the alkyl group is 1 to 5, preferably 1 to 3. The carbon atom number of the alkyl group does not include the carbon atom number of the alkoxy group. Specific examples of the alkyl group include a methyl group, an ethyl group, a propyl group, a butyl group, and a pentyl group etc. Specific examples of the alkoxyalkyl group include a methoxymethyl group, a methoxyethyl group, a methoxypropyl group, an ethoxymethyl group, an ethoxyethyl group, an ethoxypropyl group, a propoxymethyl group, a propoxyethyl group, a propoxypropyl group etc.

Introduction of the alkoxyalkyl group can be attained in a variety of polymers such as a homopolymer, a copolymer and a graft polymer, as long as the polymer has an amide bond. From a viewpoint of mixing with the glycol, a mechanical strength after curing etc., which are the purport of the present invention, it is preferable that the alkoxyalkyl group is introduced into an aliphatic polyamide, so-called a nylon resin. As the nylon resin, there are, for example, nylon 46 comprising butanediamine and adipic acid, nylon 66 comprising hexamethylenediamine and adipic acid, nylon 610 comprising hexamethylenediamine and sebacic acid, nylon 6 comprising ε-caprolactam, nylon 11 comprising undecanelactam, nylon 12 comprising lauryllactam etc.

An alkoxy-alkylation rate in the alkoxy-alkylated polyamide (i.e. an introduction rate or a substitution rate of the alkoxyalkyl group) is usually 10 to 40%, preferably 25 to 35%, from a viewpoint of a solubility. The alkoxy-alkylation rate is a ratio of the number of introduced alkoxyalkyl groups to the number of nitrogen atoms in a polyamide. For example, the alkoxy-alkylation rate of a methoxy-methylated polyamide is a methoxy-methylation rate.

A molecular weight of the alkoxy-alkylated polyamide is not particularly limited, but is usually 5,000 to 100,000, preferably 10,000 to 50,000.

Since a general polyamide resin is high in a solvent-resisting property, a melting point and a glass transition temperature, it is difficult to put it into a viscous paste state, and further, since the resin is high in a water-absorbing property and a water permeability, combinational use with a silver-based electrically conductive material such as silver nanowires having a low ion migration-resisting property was unsuitable. On the other hand, since an alkoxy-alkylated polyamide resin dissolves in an organic solvent having a high polarity, and further causes a crosslinking reaction due to the heat and an acid, it becomes possible to make the resin into a paste and thermally cure the resin. However, the alkoxy-alkylated polyamide was a material in which combinational use with a silver-based electrically conductive material is difficult due to a water absorbing property and a water permeability derived from a polyamide skeleton. Furthermore, when an acid is used, the alkoxy-alkylated polyamide was a material in which combinational use with a copper-based electrically conductive material having a low oxidation-resisting property, such as copper nanowires, is difficult. Since nickel is excellent in an ion migration-resisting property and an oxidation-resisting property, combinational use with the alkoxy-alkylated polyamide is possible. Particularly, since the nickel nanowires and the alkoxy-alkylated polyamide (in particular, methoxy-methylated polyamide) have a good affinity with a glycol to be used in combination, these enable to suppress phase separation and cure the paste while reducing the nickel nanowires, and a coated film excellent in an electrical conductivity is obtained. Furthermore, since a thermal curing time is comparatively short, application to a plastic having a comparatively low heat-resisting property (e.g. polyethylene terephthalate, polyurethane etc.) is possible. Moreover, as compared with an epoxy resin that is a representative of a thermosetting resin, a curing time is short, and a cured structure is also excellent in a flexibility and a mechanical strength such as a toughness.

As the alkoxy-alkylated polyamide, a commercially available product can also be used, or it can also be produced. Examples of the commercially available product of the alkoxy-alkylated polyamide include FINE RESIN (registered trademark) (made by Namariichi Co., Ltd.; methoxymethylated polyamide 6) and the like.

From a viewpoint of further improvement in a storage stability of the paste and an alcohol-resisting property and electromagnetic-wave shielding properties of the cured structure, as well as immobilization of the nanowires, the content of the alkoxy-alkylated polyamide is preferably 10% by mass or less (in particular, 0.01 to 10% by mass), more preferably 5% by mass or less (in particular, 0.1 to 5% by mass), further preferably 1% by mass or less (in particular, 0.1 to 1% by mass) based on the total amount of the paste.

From a viewpoint of further improvement in an initial electrical conductivity and electromagnetic-wave shielding properties of the cured structure, uniform insurance of the strength of the cured structure (e.g. a bending property), and suppression of peeling of the nanowires due to bending (e.g. a bending property), the content of the alkoxy-alkylated polyamide is preferably 1 part by mass or more (in particular, 1 to 40 parts by mass), more preferably 2 parts by mass or more (in particular, 2 to 40 parts by mass), further preferably 4 parts by mass or more (in particular, 4 to 35 parts by mass), particularly preferably 5 parts by mass or more (in particular, 5 to 30 parts by mass), most preferably 10 parts by mass or more (in particular, 10 to 25 parts by mass) based on 100 parts by mass of the nickel nanowires.

It is necessary that the paste of the present invention contains a solvent, for the purpose of improving a fluidity of the paste, and improving a handleability thereof. In the present invention, a main component of the solvent is a glycol. The glycol is a chain aliphatic hydrocarbon-based diol. When the paste does not contain the glycol, since a passive layer on the nanowires surface cannot be reduced, and a structure obtained by curing the paste does not afford an excellent electrical conductivity, this is not preferable. When a monoalcohol (e.g. ethanol) is used in place of the glycol, a storage stability of the paste is decreased, and further, electromagnetic-wave shielding properties of the cured structure are decreased. The expression that a main component of the solvent is a glycol means that the glycol is contained at 50% by mass or more, preferably 90% by mass or more based on the total amount of the solvent.

Examples of the glycol include ethylene glycol, propylene glycol, trimethylene glycol, diethylene glycol, dipropylene glycol, triethylene glycol, and tripropylene glycol. Inter alia, ethylene glycol and propylene glycol are preferable due to a comparatively low boiling point, and easy removal. One kind of the glycol may be used alone, or two or more kinds of glycols may be used by combining them.

From a viewpoint of further improvement in electromagnetic-wave shielding properties of the cured structure based on reduction of a passive layer on the nanowires surface and a storage stability of the paste, the content of the glycol is preferably 40 to 98.9% by mass, more preferably 50 to 98.9% by mass, further preferably 60 to 98.9% by mass, most preferably 60 to 97.5% by mass based on the total amount of the paste. Furthermore, from a viewpoint of further improvement in a storage stability of the paste and electromagnetic-wave shielding properties, a dry thermal curing property, a salt water-resisting property and an alcohol-resisting property of the cured structure, the content of the glycol is 1 part by mass or more (in particular, 1 to 40 parts by mass), more preferably 10 parts by mass or more (in particular, 10 to 40 parts by mass), further preferably 30 parts by mass or more (in particular, 30 to 40 parts by mass) based on 1 part by mass of the nickel nanowires. Since a passive layer of the nickel nanowires is easily reduced, it is preferable that the content of the glycol is large.

During manufacturing and purifying process, the nickel nanowires react with oxygen in the liquid to form a passive layer on the surface. However, even when the paste containing the nickel nanowires having a passive layer on the surface is incorporated into a structure without reducing the nickel nanowires, a high electrical conductivity cannot be obtained. In contrast, since the paste of the present invention contains the alkoxy-alkylated polyamide, a curing rate is high, and since the paste contains the glycol, a passive layer of the nickel nanowire can be reduced at thermal curing, and therefore the curing can be performed simultaneously with the surface of the nickel nanowire reduced. As a result, even when stored as the paste for a long time, a structure obtained by curing the paste becomes excellent in an electrical conductivity and electromagnetic-wave shielding properties.

In order to make the alkoxy-alkylated polyamide cross-linked between molecules thereof, it is preferable that the paste of the present invention further contains an acid catalyst. When the paste of the present invention contains the acid catalyst, an alcohol-resisting property of the cured structure is improved, and a salt water-resisting property is further improved. The paste may be stored in the state where the acid catalyst is contained in the paste in advance, or the acid catalyst may be contained in the paste immediately before curing treatment without being contained in the paste at storage. Examples of the acid catalyst include organic acids such as paratoluenesulfonic acid, citric acid, lactic acid, tartaric acid, succinic acid, maleic acid, oxalic acid and adipic acid; and inorganic acids such as hydrochloric acid and hypophosphorous acid. One kind of the acid catalyst may be used alone, or two or more kinds of acid catalysts may be used by combining them. Inter alia, an organic acid is preferable, and since oxalic acid has also a reducing action, and can still more reduce a passive layer formed on the nickel nanowire surface, it is further preferable.

When the acid catalyst is contained, the content thereof is preferably 0.001 to 0.5% by mass, particularly less than 0.5% by mass based on the total amount of the paste. Furthermore, the content of the acid catalyst is usually 1 to 10 parts by mass, and from a viewpoint of further improvement in a storage stability and a dry thermal curing property of the paste and a salt water-resisting property and an alcohol-resisting property of the cured structure, as well as prevention of reduction in physical properties (a bending property) of the cured structure, the content of the acid catalyst is preferably 1 to 5 parts by mass, more preferably 2 to 4 parts by mass, further preferably 3 to 4 parts by mass based on 100 parts by mass of the alkoxy-alkylated polyamide.

Since vaporization of the glycol can be promoted, and a curing rate can be increased, it is preferable that the paste of the present invention further contains glycol alkyl ether. The glycol alkyl ether is a glycol derivative in which of two hydroxy groups of a glycol, at least one, preferably one hydroxy group is alkyl-etherized. A glycol constituting the glycol alkyl ether is the same as the above-mentioned glycol that is mixed into the paste, and is preferably ethylene glycol and/or propylene glycol. An alkyl group of alkyl ether constituting the glycol alkyl ether is an alkyl group having 1 to 5 (preferably, 1 to 3) carbon atoms, and examples thereof include a methyl group, an ethyl group, a propyl group, a butyl group, and a pentyl group etc.

Specific example of the glycol alkyl ether include ethylene glycol monomethyl ether, ethylene glycol monoethyl ether, ethylene glycol monopropyl ether, propylene glycol-1-monomethyl ether, propylene glycol-2-monomethyl ether, propylene glycol-1-monoethyl ether, propylene glycol-2-monoethyl ether, propylene-glycol-1-monopropyl ether, propylene glycol-2-monopropyl ether, ethylene glycol dimethyl ether, ethylene glycol diethyl ether, ethylene glycol dipropyl ether, propylene glycol dimethyl ether, propylene glycol diethyl ether, and propylene glycol dipropyl ether. One kind of the glycol alkyl ether may be used alone, or two or more kinds of glycol alkyl ethers may be used by combining them. Inter alia, ethylene glycol monomethyl ether, ethylene glycol monoethyl ether, ethylene glycol monobutyl ether and ethylene glycol monopropyl ether having a boiling point of around 100 to 160° C. are preferable.

When the glycol alkyl ether is contained, the content of the glycol alkyl ether is usually 70% by mass or less (in particular, 1 to 70% by mass), preferably less than 50% by mass (in particular, 1% by mass or more and less than 50% by mass), more preferably 45% by mass or less (in particular, 2 to 45% by mass) based on the total amount of the paste. Furthermore, from a viewpoint of further improvement in an initial electrical conductivity and electromagnetic-wave shielding properties of the cured structure due to a reducing property of the glycol, the content of the glycol alkyl ether is preferably 1 to 150 parts by mass, more preferably 1 to 100 parts by mass, further preferably 5 to 100 parts by mass, particularly preferably 5 to 50 parts by mass, most preferably 5 to 10 parts by mass based on 100 parts by mass of the glycol. Particularly, from a viewpoint of further improvement in electromagnetic-wave shielding properties, the content of the glycol alkyl ether is preferably 150 parts by mass or less (i.e. 0 to 150 parts by mass), more preferably 100 parts by mass or less (i.e. 0 to 100 parts by mass), particularly preferably 50 parts by mass or less (i.e. 0 to 50 parts by mass) based on 100 parts by mass of the glycol.

Various additives such as a thickener, a leveling agent and a wetting agent may be further added to the paste of the present invention, in such a range that the effect of the present invention is not deteriorated.

The paste of the present invention can be obtained by mixing nickel nanowires, an alkoxy-alkylated polyamide and a glycol as well as other desired additives (e.g. acid catalyst, glycol alkyl ether). In the paste, the alkoxy-alkylated polyamide is dissolved in at least the glycol, and the nickel nanowires are dispersed therein. When the paste contains the acid catalyst and/or the glycol alkyl ether, from a viewpoint of a solubility of the alkoxy-alkylated polyamide, it is preferable that after the nickel nanowires, the alkoxy-alkylated polyamide and the glycol are mixed, the relevant mixture, and the acid catalyst or the glycol alkyl ether or a mixture thereof are further mixed.

A mixing method is not particularly limited, but may be, for example, a method using a mixing machine equipped with blades etc.

The paste of the present invention is applied on various base materials, or filled into a mold etc., and thereafter, thermally treated at 130 to 160° C. for around 15 minutes (e.g. 10 to 60 minutes) to thereby cure, and a structure excellent in an electrical conductivity containing the nickel nanowires can be obtained. In the present description, curing includes and means not only so-called solidification by removal of volatile components such as a glycol (as well as an optionally mixed acid catalyst and/or glycol alkyl ether) from the paste, but also crosslinking in which alkoxy-alkylated polyamides are interconnected to form a three-dimensional structure. Crosslinking is attained by formation of a state where N of an amide bond is bound between molecules thereof with an alkene.

The paste of the present invention is not only excellent in a dry thermal curing property and a storage stability, but also is able to manufacture a cured structure that is excellent in properties such as an electrical conductivity, strength properties (in particular, a bending property), a water-resisting property, a salt water-resisting property and electromagnetic-wave shielding properties. The cured structure of the paste of the present invention is also excellent in a heat-resisting property.

In the paste of the present invention, an alcohol-resisting property of the cured structure is improved by containing an acid catalyst. In addition, an alcohol-resisting property is not a property that is necessarily possessed by the paste of the present invention, but is a property that is newly obtained by containing the acid catalyst.

In the present description, a dry thermal curing property is such a property of the paste that the paste can be dried and cured at a comparatively low temperature (e.g. 150° C.) for a comparatively short time (e.g. 10 to 60 minutes).

A storage stability of the paste is such a property that even if the paste is stored for a long time (at least for 6 months), it is not gelled, and a structure having an electrical conductivity comparable to that of an initial paste can be manufactured.

A bending property of a cured structure of the paste is such a property that even if the structure is bent, it can have an electrical conductivity comparable to that before bending.

A water-resisting property of a cured structure of the paste is such a property that even if the structure is immersed in water for a long time (e.g. 24 hours), it can have an electrical conductivity comparable to that before immersion.

A salt water-resisting property of a cured structure of the paste is such a property that even if the structure is immersed in salt water for a long time (e.g. 140 hours), it can have an electrical conductivity comparable to that before immersion.

An alcohol-resisting property of a cured structure of the paste is such a property that even if the structure is immersed in an alcohol (e.g. ethanol) for a long time (e.g. 24 hours), it can have an electrical conductivity comparable to that before immersion.

Electromagnetic-wave shielding properties of a cured structure of the paste are such properties that an electromagnetic wave in a region of 18 GHz to 26.5 GHz is shielded. Electromagnetic-wave shielding properties are properties effective in suppressing an inter-chip noise of communication standards such as Wi-Fi and NFC, as well as a noise from a wiring and a battery.

A heat-resisting property of a cured structure of the paste is such a property that even if the structure is heated for a long time (e.g. 500 hours), it can have an electrical conductivity comparable to that before heating. A heat-resisting property is a property effective in use under the high temperature environment such as vehicle installation.

EXAMPLES

The present invention will be specifically illustrated below by way of Examples, but the present invention is not limited by them.

(1) Dry Thermal Curing Property Assessment

A paste was applied on three slide glasses, and heat-treated at 150° C. for 10 minutes, 15 minutes, 30 minutes, or 1 hour. After heat treatment, the slide glasses were cooled to room temperature, and the presence or the absence of curing was confirmed. "Cured" is the state where there is no fluidity in the paste, and "uncured" is the state where a fluidity remains in the paste, and assessment was performed as follows:

⊙: All parts were completely cured.

Δ: There were a few uncured parts, but other parts were completely cured (accepted).

×: Comparatively many parts were uncured (not accepted).

(2) Initial Performance

A paste was applied on a PET film (Lumirror T60#100 made by Toray Industries, Inc.), and drying thermal treatment at 150° C. for 1 hour was performed. In the resulting sheet, in accordance with JIS K 7194 (1994), a volume resistivity was measured at five places, and an average value $R_{v0}$ was obtained.

(3) After Storage for 6 Months

In samples having the assessment of (1) of "Δ" or higher, the paste was hermetically stored at room temperature for 6 months under the air atmosphere. After 6 months, using the stored paste, the same operation as that of (2) was performed, and a volume resistivity $R_{v6}$ was obtained.

Furthermore, a change rate of the volume resistivity before and after 6 months storage was calculated by the following expression (i):

$$\text{Change rate}=(R_{v6}-R_{v0})/R_{v0}\times 100 \qquad (i)$$

⊚: A change rate was within a range of ±10% (best).

⊙: A change rate was within a range of ±20% (good).

Δ: A change rate was within a range of ±100%, and was a range having no practical problems (accepted).

×: A change rate was outside a range of ±100% (not accepted).

An assessing rank showed a highest rank, among ranks in which predetermined change rates are classified.

Concerning a storage stability, when the storage stability after storage for 6 months attained "Δ" or higher, the relevant paste is excellent in a storage stability.

Concerning a storage stability, it is preferable that not only the storage stability after storage for 6 months, but also the storage stability after storage for 9 months described later is also excellent.

(4) After Storage for 9 Months

As in the assessment of (3), the paste was hermetically sealed, and stored at room temperature for 9 months under the air atmosphere. After 9 months, using the stored paste, the same operation as that of (2) was performed, and a volume resistivity $R_{v9}$ was obtained.

Furthermore, a change rate of the volume resistivity before and after storage for 9 months was calculated by the following expression (ii):

$$\text{Change rate}=(R_{v9}-R_{v0})/R_{v0}\times 100 \qquad (ii)$$

An assessment rank was shown by the same method as that of the assessment rank of (3).

(5) Bending Property

After the assessment of (2), a sample was bent along the circumference of a round bar having a diameter of 10 mm, with a coated surface being on an outer side, and a base material surface being on an inner side, and change in an appearance and a volume resistivity $R_{vf}$ were measured. Change in an appearance was based on the following assessment criteria:

⊙: No change.

Δ: There is a crack of a coated film at an end part (accepted).

×: Totally, a crack and peeling of a coated film were generated (not accepted).

Furthermore, a change rate of the volume resistivity after winding was calculated by the following expression (iii):

$$\text{Change rate}=(R_{vf}-R_{v0})/R_{v0}\times 100 \qquad (iii)$$

⊚: A change rate was within a range of ±10% (best).

⊙: A change rate was within a range of ±20% (good).

Δ: A change rate was within a range of ±30%, and was a range having no practical problems (accepted).

×: A change rate was outside a range of ±30% (not accepted).

An assessment rank showed a highest rank, among ranks in which predetermined change rates are classified.

(6) Heat-Resisting Property

The paste film after the assessment of (2) was stored at 90° C. for 500 hours, and a volume resistivity $R_vT$ after storage was measured. A change rate of the volume resistivity after a test was calculated by the following expression (iv):

$$\text{Change rate}=(R_{vT}-R_{v0})/R_{v0}\times 100 \qquad (iv)$$

An assessment rank was shown by the same method as that of the assessment rank of (5).

(7) Water-Resisting Property

The paste film after the assessment (2) was immersed in water at 20° C., electrodes were attached to both ends, and the current of 10 mA as a direct current was flown for 24 hours. After immersion, the film was dried at 100° C. for 1 minute, and a volume resistivity $R_vw$ was measured. A change rate of the volume resistivity after a test was calculated by the following expression (v):

$$\text{Change rate}=(R_{vW}-R_{v0})/R_{v0}\times 100 \qquad (v)$$

An assessment rank was shown by the same method as that of the assessment rank of (5).

(8) Salt Water-Resisting Property

The paste film after the assessment of (2) was immersed in 3.5% sodium chloride water at 20° C., electrodes were attached to both ends, and the current of 10 mA as a direct current was flown for 140 hours. After immersion, the film was dried at 100° C. for 1 minute, and a volume resistivity $R_vs$ was measured. A change rate of the volume resistivity after a test was calculated by the following expression (vi):

$$\text{Change rate}=(R_{vS}-R_{v0})/R_{v0}\times 100 \qquad (vi)$$

An assessment rank was shown by the same method as that of the assessment rank of (5).

(9) Alcohol-Resisting Property

The paste film after the assessment of (2) was immersed in ethanol for 24 hours. After immersion, the film was dried at 100° C. for 1 minute, and a volume resistivity LA was measured. A change rate of the volume resistivity after a test was calculated by the following expression (vii):

$$\text{Change rate}=(R_{vA}-R_{v0})/R_{v0}\times 100 \qquad (vii)$$

An assessment rank was shown by the same method as that of the assessment rank of (5).

(10) Electromagnetic-wave shielding properties A paste was applied on a PET film (Lumirror T60#100 made by Toray Industries, Inc.) as in the assessment (2), drying thermal treatment at 150° C. for 1 hour was performed, and a sheet having a paste film having a thickness of 15 nm was prepared. The sheet was processed into 150 mm square, and shielding properties at 18 GHz to 26.5 GHz was measured by a free space method. In assessment, an average value in a region of 18 GHz to 26.5 GHz was calculated. Preferable is 30 db or higher.

⊚: 40 db or higher (best).

⊙: 35 db or higher (good).

Δ: 30 db or higher (accepted)
x: Lower than 30 db (not accepted)

Method of preparing electrically conductive material

NiNW-1

Nickel chloride hexahydrate (4.00 g, 16.8 mmol), and trisodium citrate dihydrate (0.375 g, 1.27 mmol) were added to ethylene glycol to obtain the total amount of 500 g. This solution was heated to 90° C. to dissolve.

In a separate container, 1.00 g of sodium hydroxide was added to ethylene glycol to obtain the total amount of 499 g. This solution was heated to 90° C. to dissolve.

After all of compounds in each solution were dissolved, 1.00 g of hydrazine monohydrate was added to a solution containing sodium hydroxide, and thereafter, two solutions were mixed.

The mixed solution was immediately placed into a magnetic circuit in which the magnetic field of 150 mT can be applied to a center, the relevant magnetic field was applied, and the solution was allowed to stand for 15 minutes while maintaining at 90 to 95° C., to perform a reducing reaction. The pH of the solution was 11.5. The concentration of nickel ions in the reaction solution was 16.8 μmol/g.

After the reaction, nanowires were collected and taken out with a neodymium magnet, and thereby, nanowires were purified and recovered. Lengths of 100 recovered nanowires were measured by SEM, an average length was 24 μm, diameters of 100 nanowires were measured by TEM, and an average diameter was 91 nm.

NiNW-2

Nickel chloride hexahydrate (2.00 g, 8.40 mmol), and trisodium citrate dihydrate (0.375 g, 1.27 mmol) were added to ethylene glycol to obtain the total amount of 500 g. This solution was heated to 90° C. to dissolve.

In a separate container, 1.00 g of sodium hydroxide was added to ethylene glycol to obtain the total amount of 499 g. This solution was heated to 90° C. to dissolve.

After all compounds in each solution were dissolved, 1.00 g of hydrazine monohydrate was added to a solution containing sodium hydroxide, and thereafter, two solutions were mixed.

The mixed solution was immediately placed into a magnetic circuit in which the magnetic field of 150 mT can be applied to a center, the relevant magnetic field was applied, and the solution was allowed to stand for 15 minutes while maintaining at 90 to 95° C., to perform a reducing reaction. The pH of the solution was 11.5. The concentration of nickel ions in the reaction solution was 16.8 μmol/g.

After the reaction, nanowires were collected and taken out with a neodymium magnet, and thereby, nanowires were purified and recovered. Lengths of 100 recovered nanowires were measured by SEM, an average length was 8 μm, diameters of 100 nanowires were measured by TEM, and an average diameter was 39 nm.

TABLE 1

| | Shape | Average diameter nm | Average length μm |
|---|---|---|---|
| NiNW-1 | Nanowire-like | 91 | 24 |
| NiNW-2 | Nanowire-like | 39 | 8 |
| Carbonyl Ni123 | Particulate | 5000 | — |

Example 1

NiNW-1 (2.70 g), FINE RESIN FR-101 (made by NAMARIICHI CO., LTD., methoxy-methylated polyamide, methoxymethylation rate: about 30%, molecular weight: about 20,000) (137 mg), and ethylene glycol (97.2 g) were mixed, and 2.51 mg of oxalic acid was further added to obtain a paste.

Example 2

NiNW-1 (2.70 g), FINE RESIN FR-101 (137 mg), and ethylene glycol (91.6 g) were mixed, and further, the mixture was mixed with a solution in which 2.51 mg of oxalic acid had been dissolved in 5.56 g of ethylene glycol monomethyl ether, to obtain a paste.

Examples 3 to 6, 9 to 13 and 16 to 17

The same operation as that of Example 2 was performed except that the composition ratio was changed to that of paste of Table 2, pastes were obtained.

Example 7

NiNW-1 (2.70 g), FINE RESIN FR-101 (137 mg), and ethylene glycol (97.2 g) were mixed to obtain a paste.

Example 8

The same operation as that of Example 1 was performed except that the composition ratio was changed to that of paste of Table 2, a paste was obtained.

Example 14

NiNW-1 (2.70 g), FINE RESIN FR-101 (291 mg), and propylene glycol (92.2 g) were mixed, and further, the mixture was mixed with a solution in which 9.00 mg of oxalic acid had been dissolved in 4.83 g of ethylene glycol monomethyl ether, to obtain a paste.

Example 15

NiNW-2 (2.70 g), FINE RESIN FR-101 (291 mg), and ethylene glycol (92.2 g) were mixed, and further, the mixture was mixed with a solution in which 9.00 mg of oxalic acid had been dissolved in 4.83 g of ethylene glycol monomethyl ether, to obtain a paste.

Comparative Example 1

NiNW-1 (2.70 g), SR-6GL (made by Sakamoto Yakuhin Kogyo Co., Ltd., epoxy resin) (137 mg), and ethylene glycol (97.2 g) were mixed, and further, 2.51 mg of oxalic acid was added to obtain a paste.

Comparative Example 2

NiNW-1 (2.70 g), SR-6GL (112 mg), and ethylene glycol (97.2 g) were mixed, and further, 28.0 mg of oxalic acid was added to obtain a paste.

Comparative Example 3

NiNW-1 (2.70 g), SR-6GL (137 mg), and ethylene glycol (91.6 g) were mixed, and further, the mixture was mixed with a solution in which 2.51 mg of oxalic acid had been dissolved in 5.56 g of ethylene glycol monomethyl ether, to obtain a paste.

Comparative Examples 4 and 9

The same procedure as that of Comparative Example 3 was performed except that the composition was changed to that of paste of Table 2, pastes were obtained.

Comparative Example 5

NiNW-1 (2.70 g), FINE RESIN FR-101 (137 mg), and ethanol (97.2 g) were mixed, and further, 2.51 mg of oxalic acid was added to obtain a paste.

Comparative Example 6

Carbonyl Ni123 (made by Fukuda Metal Foil & Powder Co., Ltd., nickel particles, diameter 5 μm) (2.70 g), FINE RESIN FR-101 (137 mg), and ethylene glycol (91.6 g) were mixed, and further, the mixture was mixed with a solution in which 2.51 mg of oxalic acid had been dissolved in 5.56 g of ethylene glycol monomethyl ether, to obtain a paste.

Comparative Example 7

The same operation as that of Comparative Example 6 was performed except that the composition was changed to that of paste of Table 2, a paste was obtained.

Comparative Example 8

NiNW-1 (2.70 g), PVP K-90 (made by Wako Pure Chemical Industries, Ltd., polyvinylpyrrolidone) (291 mg) and ethylene glycol (97.0 g) were mixed to obtain a paste.

Comparative Example 10

NiNW-1 (2.70 g) and ethylene glycol (97.3 g) were mixed to obtain a paste.

Compositions and assessment results of pastes obtained in Examples 1 to 17 and Comparative Examples 1 to 10 are shown in Tables 2, 3 and 4.

TABLE 2

| | Paste composition | | | | | | |
|---|---|---|---|---|---|---|---|
| | Electrical conductive material | | Binder | | Acid catalyst | | |
| | Kind | Content (1) % by mass | Kind | Content (1) % by mass | Kind | Content (1) % by mass | Solvent (s1) Kind |
| Example 1 | NiNW-1 | 2.69893 | FINE RESIN FR-101 | 0.13695 | Oxalic acid | 0.00251 | Ethylene glycol |
| Example 2 | NiNW-1 | 2.70001 | FINE RESIN FR-101 | 0.13700 | Oxalic acid | 0.00251 | Ethylene glycol |
| Example 3 | NiNW-1 | 21.78808 | FINE RESIN FR-101 | 1.11939 | Oxalic acid | 0.03468 | Ethylene glycol |
| Example 4 | NiNW-1 | 45.00000 | FINE RESIN FR-101 | 2.30000 | Oxalic acid | 0.05000 | Ethylene glycol |
| Example 5 | NiNW-1 | 2.69866 | FINE RESIN FR-101 | 0.04868 | Oxalic acid | 0.00110 | Ethylene glycol |
| Example 6 | NiNW-1 | 2.69893 | FINE RESIN FR-101 | 0.13695 | Oxalic acid | 0.0025 | Ethylene glycol |
| Example 7 | NiNW-1 | 2.69900 | FINE RESIN FR-101 | 0.13695 | — | 0 | Ethylene glycol |
| Example 8 | NiNW-1 | 2.69889 | FINE RESIN FR-101 | 0.13694 | Oxalic acid | 0.00426 | Ethylene glycol |
| Example 9 | NiNW-1 | 2.69997 | FINE RESIN FR-101 | 0.13700 | Oxalic acid | 0.00426 | Ethylene glycol |
| Example 10 | NiNW-1 | 2.69883 | FINE RESIN FR-101 | 0.08096 | Oxalic acid | 0.00251 | Ethylene glycol |
| Example 11 | NiNW-1 | 2.69865 | FINE RESIN FR-101 | 0.29085 | Oxalic acid | 0.00900 | Ethylene glycol |
| Example 12 | NiNW-1 | 2.69986 | FINE RESIN FR-101 | 0.65497 | Oxalic acid | 0.02030 | Ethylene glycol |
| Example 13 | NiNW-1 | 2.69889 | FINE RESIN FR-101 | 0.29088 | Oxalic acid | 0.02029 | Ethylene glycol |
| Example 14 | NiNW-1 | 2.69919 | FINE RESIN FR-101 | 0.29091 | Oxalic acid | 0.00900 | Propylene glycol |
| Example 15 | NiNW-2 | 2.69919 | FINE RESIN FR-101 | 0.29091 | Oxalic acid | 0.00900 | Propylene glycol |
| Example 16 | NiNW-1 | 21.80131 | FINE RESIN FR-101 | 5.29032 | Oxalic acid | 0.16401 | Ethylene glycol |
| Example 17 | NiNW-1 | 2.70000 | FINE RESIN FR-101 | 0.29100 | Oxalic acid | 0.00900 | Ethylene glycol |
| Comparative Example 1 | NiNW-1 | 2.69893 | SR-6GL | 0.13695 | Oxalic acid | 0.00251 | Ethylene glycol |
| Comparative Example 2 | NiNW-1 | 2.69892 | SR-6GL | 0.11196 | Oxalic acid | 0.02799 | Ethylene glycol |
| Comparative Example 3 | NiNW-1 | 2.70001 | SR-6GL | 0.13700 | Oxalic acid | 0.00251 | Ethylene glycol |
| Comparative Example 4 | NiNW-1 | 2.70000 | SR-6GL | 0.11200 | Oxalic acid | 0.02800 | Ethylene glycol |
| Comparative Example 5 | NiNW-1 | 2.69893 | FINE RESIN FR-101 | 0.13695 | Oxalic acid | 0.00251 | Ethanol |
| Comparative Example 6 | Carbonyl Ni123 | 2.70001 | FINE RESIN FR-101 | 0.13700 | Oxalic acid | 0.00251 | Ethylene glycol |
| Comparative Example 7 | Carbonyl Ni123 | 2.69865 | FINE RESIN FR-101 | 0.29085 | Oxalic acid | 0.00900 | Ethylene glycol |
| Comparative Example 8 | NiNW-1 | 2.70024 | PVPK-90 | 0.29103 | — | 0 | Ethylene glycol |
| Comparative Example 9 | NiNW-1 | 2.69963 | SR-6GL | 0.29096 | Oxalic acid | 0.07269 | Ethylene glycol |
| Comparative Example 10 | NiNW-1 | 2.70000 | — | 0 | — | 0 | Ethylene glycol |

| | Paste composition | | | | | | |
|---|---|---|---|---|---|---|---|
| | Solvent (s1) | Solvent (s2) | | | Content (3) | Content (4) | Content (5) |
| | Content (1) % by mass | Kind | Content (1) % by mass | Content (2) of binder | of acid catalyst | of solvent (s1) | of solvent (s2) |
| Example 1 | 97.16161 | — | 0 | 5.07 | 1.83 | 36.00 | 0 |
| Example 2 | 91.60045 | Ethylene glycol monomethyl ether | 5.56003 | 5.07 | 1.83 | 33.93 | 6.07 |
| Example 3 | 72.56031 | Ethylene glycol monomethyl ether | 4.49754 | 5.14 | 3.10 | 3.33 | 6.20 |
| Example 4 | 49.60000 | Ethylene glycol monomethyl ether | 3.05000 | 5.11 | 2.17 | 1.10 | 6.15 |
| Example 5 | 91.75431 | Ethylene glycol monomethyl ether | 5.49726 | 1.80 | 2.26 | 34.00 | 5.99 |
| Example 6 | 57.17741 | Ethylene glycol monomethyl ether | 39.98421 | 5.07 | 1.83 | 21.19 | 69.9 |
| Example 7 | 97.16405 | — | 0 | 5.07 | 0 | 36.00 | 0 |
| Example 8 | 97.15991 | — | 0 | 5.07 | 3.11 | 36.00 | 0 |
| Example 9 | 92.29884 | Ethylene glycol monomethyl ether | 4.85994 | 5.07 | 3.11 | 34.19 | 5.27 |
| Example 10 | 92.35981 | Ethylene glycol monomethyl ether | 4.85789 | 3.00 | 3.10 | 34.22 | 5.26 |
| Example 11 | 92.15392 | Ethylene glycol monomethyl ether | 4.84758 | 10.8 | 3.09 | 34.15 | 5.26 |
| Example 12 | 91.79513 | Ethylene glycol monomethyl ether | 4.82974 | 24.3 | 3.10 | 34.00 | 5.26 |
| Example 13 | 92.16194 | Ethylene glycol monomethyl ether | 4.82801 | 10.8 | 6.98 | 34.15 | 5.24 |

TABLE 2-continued

| | | | | | | |
|---|---|---|---|---|---|---|
| Example 14 | 92.17235 | Ethylene glycol monomethyl ether | 4.82855 | 10.8 | 3.09 | 34.15 | 5.24 |
| Example 15 | 92.17235 | Ethylene glycol monomethyl ether | 4.82855 | 10.8 | 3.09 | 34.15 | 5.26 |
| Example 16 | 69.10415 | Ethylene glycol monomethyl ether | 3.64022 | 24.3 | 3.10 | 3.17 | 5.27 |
| Example 17 | 47.00000 | Ethylene glycol monomethyl ether | 50.00000 | 10.8 | 3.09 | 17.41 | 106 |
| Comparative Example 1 | 97.16161 | — | 0 | 5.07 | 1.83 | 36.00 | 0 |
| Comparative Example 2 | 97.16114 | — | 0 | 4.15 | 25.0 | 36.00 | 0 |
| Comparative Example 3 | 91.60045 | Ethylene glycol monomethyl ether | 5.56003 | 5.07 | 1.83 | 33.93 | 6.07 |
| Comparative Example 4 | 91.60000 | Ethylene glycol monomethyl ether | 5.56000 | 4.15 | 25.0 | 33.93 | 6.07 |
| Comparative Example 5 | 97.16161 | — | 0 | 5.07 | 1.83 | 36.00 | 0 |
| Comparative Example 6 | 91.60045 | Ethylene glycol monomethyl ether | 5.56003 | 5.07 | 1.80 | 33.93 | 6.07 |
| Comparative Example 7 | 92.15392 | Ethylene glycol monomethyl ether | 4.84758 | 10.8 | 3.09 | 34.15 | 5.26 |
| Comparative Example 8 | 97.00873 | — | 0 | 10.8 | 0 | 35.93 | 0 |
| Comparative Example 9 | 92.08738 | Ethylene glycol monomethyl ether | 4.84934 | 10.8 | 25.0 | 34.11 | 5.27 |
| Comparative Example 10 | 97.30000 | — | 0 | 0 | 0 | 36.04 | 0 |

(1) Content based on a total amount of paste:
(2) Content of a binder based on 100 parts by mass of an electrically conductive material:
(3) Content of an acid catalyst based on 100 parts by mass of a binder:
(4) Content of a solvent (s1) based on 1 part by mass of an electrically conductive material:
(5) Content of a solvent (s2) based on 100 parts by mass of a solvent (s1).

TABLE 3

| | Paste assessment ||||||||
|---|---|---|---|---|---|---|---|---|
| | Dry thermal curing property |||| Initial performance | After storage for 6 months || After storage for 9 months ||
| | Thermal treatment for 10 minutes | Thermal treatment for 15 minutes | Thermal treatment for 30 minutes | Thermal treatment for 1 hour | Volume resistivity $R_{v0}$ $\Omega \cdot cm$ | Volume resistivity $R_{v6}$ $\Omega \cdot cm$ | Change rate % | Volume resistivity $R_{v9}$ $\Omega \cdot cm$ | Change rate % |
| Example 1 | Δ | ○ | ○ | ○ | 0.0059 | 0.0057 | ⊙-3 | 0.0063 | ⊙7 |
| Example 2 | ○ | ○ | ○ | ○ | 0.0024 | 0.0025 | ⊙4 | 0.0026 | ⊙8 |
| Example 3 | ○ | ○ | ○ | ○ | 0.0059 | 0.0058 | ⊙-2 | 0.0063 | ⊙7 |
| Example 4 | Δ | Δ | ○ | ○ | 0.0035 | 0.0067 | Δ91 | Gelling | — |
| Example 5 | Δ | Δ | Δ | Δ | 0.01 | 0.011 | ⊙10 | 0.013 | Δ30 |
| Example 6 | ○ | ○ | ○ | ○ | 0.021 | 0.021 | ⊙0 | 0.043 | X105 |
| Example 7 | Δ | Δ | ○ | ○ | 0.0042 | 0.0043 | ⊙2 | 0.0043 | ⊙2 |
| Example 8 | Δ | Δ | ○ | ○ | 0.0039 | 0.0037 | ⊙-5 | 0.0041 | ⊙5 |
| Example 9 | ○ | ○ | ○ | ○ | 0.0027 | 0.0028 | ⊙4 | 0.0027 | ⊙0 |
| Example 10 | ○ | ○ | ○ | ○ | 0.0052 | 0.0055 | ⊙6 | 0.0056 | ⊙8 |
| Example 11 | ○ | ○ | ○ | ○ | 0.0017 | 0.0017 | ⊙0 | 0.0018 | ⊙6 |
| Example 12 | ○ | ○ | ○ | ○ | 0.0027 | 0.0028 | ⊙4 | 0.0029 | ⊙7 |
| Example 13 | ○ | ○ | ○ | ○ | 0.0033 | 0.0035 | ⊙6 | 0.0048 | Δ45 |
| Example 14 | ○ | ○ | ○ | ○ | 0.0016 | 0.0017 | ⊙6 | 0.0015 | ⊙-6 |
| Example 15 | ○ | ○ | ○ | ○ | 0.013 | 0.011 | ○-15 | 0.012 | ⊙-8 |
| Example 16 | ○ | ○ | ○ | ○ | 0.0087 | 0.0100 | ○15 | Gelling | — |
| Example 17 | ○ | ○ | ○ | ○ | 0.035 | 0.037 | ⊙6 | 0.082 | X134 |
| Comparative Example 1 | X | X | X | X | — | — | — | — | — |
| Comparative Example 2 | X | X | X | X | — | — | — | — | — |
| Comparative Example 3 | X | X | X | X | — | — | — | — | — |
| Comparative Example 4 | X | X | X | X | — | — | — | — | — |
| Comparative Example 5 | ○ | ○ | ○ | ○ | 4.2 | 870000 | X20714186 | Insulation | — |
| Comparative Example 6 | Δ | ○ | ○ | ○ | Insulation | Insulation | — | Insulation | — |
| Comparative Example 7 | ○ | ○ | ○ | ○ | Insulation | Insulation | — | Insulation | — |
| Comparative Example 8 | Δ | Δ | ○ | ○ | 0.0038 | 0.0039 | ⊙3 | 0.004 | ⊙5 |
| Comparative Example 9 | X | X | X | Δ | 0.061 | Gelling | — | Gelling | — |
| Comparative Example 10 | Δ | ○ | ○ | ○ | 0.0042 | 0.0043 | ⊙2 | 0.0042 | ⊙0 |

"—" shows not measured, or unmeasurable.

TABLE 4

| | Paste film assessment |||||||
|---|---|---|---|---|---|---|---|
| | Initial performance | Bending property || Heat-resisting property || water-resisting property |
| | Volume resistivity $R_{v0}$ $\Omega \cdot cm$ | Appearance | Volume resistivity $R_{vf}$ $\Omega \cdot cm$ | Change rate % | Volume resistivity $R_{vT}$ $\Omega \cdot cm$ | Change rate % | Volume resistivity $R_{vW}$ $\Omega \cdot cm$ |
| Example 1 | 0.0059 | ○ | 0.0058 | ⊙-2 | 0.0059 | ⊙0 | 0.006 |
| Example 2 | 0.0024 | ○ | 0.0024 | ⊙0 | 0.0023 | ⊙-4 | 0.0022 |

TABLE 4-continued

| | | | | | | | |
|---|---|---|---|---|---|---|---|
| Example 3 | 0.0059 | ○ | 0.0060 | ⊙2 | 0.0058 | ⊙-2 | 0.0058 |
| Example 4 | 0.0035 | ○ | 0.0035 | ⊙0 | 0.0035 | ⊙0 | 0.0034 |
| Example 5 | 0.010 | △ | 0.012 | ○17 | 0.013 | △30 | 0.012 |
| Example 6 | 0.021 | ○ | 0.022 | ⊙5 | 0.021 | ⊙0 | 0.022 |
| Example 7 | 0.0042 | ○ | 0.0044 | ⊙5 | 0.0042 | ⊙0 | 0.0038 |
| Example 8 | 0.0039 | ○ | 0.0039 | ⊙0 | 0.0038 | ⊙-3 | 0.0040 |
| Example 9 | 0.0027 | ○ | 0.0028 | ⊙4 | 0.0025 | ⊙-7 | 0.0029 |
| Example 10 | 0.0052 | △ | 0.0054 | ⊙4 | 0.0055 | ⊙6 | 0.0054 |
| Example 11 | 0.0017 | ○ | 0.0017 | ⊙0 | 0.0017 | ⊙0 | 0.0018 |
| Example 12 | 0.0027 | ○ | 0.0027 | ⊙0 | 0.0027 | ⊙0 | 0.0028 |
| Example 13 | 0.0033 | ○ | 0.0032 | ⊙-3 | 0.0032 | ⊙-3 | 0.0034 |
| Example 14 | 0.0016 | ○ | 0.0016 | ⊙0 | 0.0017 | ⊙6 | 0.0017 |
| Example 15 | 0.013 | ○ | 0.013 | ⊙0 | 0.012 | ⊙-8 | 0.014 |
| Example 16 | 0.0087 | ○ | 0.0088 | ⊙1 | 0.0088 | ⊙1 | 0.0086 |
| Example 17 | 0.035 | ○ | 0.035 | ⊙0 | 0.036 | ⊙3 | 0.037 |
| Comparative example 1 | — | — | — | — | — | — | — |
| Comparative example 2 | — | — | — | — | — | — | — |
| Comparative example 3 | — | — | — | — | — | — | — |
| Comparative example 4 | — | — | — | — | — | — | — |
| Comparative example 5 | 4.2 | ○ | 4.4 | ⊙5 | 4.4 | ⊙5 | 4.3 |
| Comparative example 6 | Insulation | ○ | — | — | — | — | — |
| Comparative example 7 | Insulation | ○ | — | — | — | — | — |
| Comparative example 8 | 0.0038 | △ | 0.0043 | ○12 | 0.0042 | ○11 | Dissolution |
| Comparative example 9 | 0.061 | X | Insulation | — | 0.055 | ⊙-10 | 0.065 |
| Comparative example 10 | 0.0042 | X | Insulation | — | Peeling | — | Peeling |

| | Paste film assessment | | | | | |
|---|---|---|---|---|---|---|
| | water-resisting property Change rate % | Salt water-resisting property | | Alcohol-resisting property | | Electromagnetic-wave shielding properties dB |
| | | Volume resistivity $R_{vS}$ Ω·cm | Change rate % | Volume resistivity $R_{vA}$ Ω·cm | Change rate % | |
| Example 1 | ⊙2 | 0.0057 | ⊙-3 | 0.0056 | ⊙-5 | ○39 |
| Example 2 | ⊙-8 | 0.0022 | ⊙-8 | 0.002 | ○-17 | ⊙43 |
| Example 3 | ⊙-2 | 0.0056 | ⊙-5 | 0.0052 | ○-12 | ⊙40 |
| Example 4 | ⊙-3 | 0.0036 | ⊙3 | 0.0037 | ⊙6 | ⊙42 |
| Example 5 | ○20 | 0.011 | ⊙10 | 0.013 | △30 | △34 |
| Example 6 | ⊙5 | 0.02 | ⊙-5 | 0.023 | ⊙10 | ○35 |
| Example 7 | ⊙-10 | 0.0047 | ○12 | Dissolution | — | ⊙41 |
| Example 8 | ⊙3 | 0.0041 | ⊙5 | 0.0042 | ⊙8 | ⊙42 |
| Example 9 | ⊙7 | 0.0029 | ⊙7 | 0.0032 | ○19 | ⊙44 |
| Example 10 | ⊙4 | 0.0053 | ⊙2 | 0.0056 | ⊙8 | ⊙40 |
| Example 11 | ⊙6 | 0.0016 | ⊙-6 | 0.0019 | ⊙10 | ⊙44 |
| Example 12 | ⊙4 | 0.0026 | ⊙-4 | 0.0029 | ⊙7 | ⊙43 |
| Example 13 | ⊙3 | 0.0032 | ⊙-3 | 0.0037 | ○12 | ⊙42 |
| Example 14 | ⊙6 | 0.0017 | ⊙6 | 0.0018 | ⊙10 | ⊙44 |
| Example 15 | ⊙8 | 0.012 | ⊙-8 | 0.015 | ○15 | ○35 |
| Example 16 | ⊙-1 | 0.0087 | ⊙0 | 0.0097 | ○11 | ○38 |
| Example 17 | ⊙6 | 0.036 | ⊙3 | 0.040 | ○14 | △32 |
| Comparative example 1 | — | — | — | — | — | X |
| Comparative example 2 | — | — | — | — | — | X |
| Comparative example 3 | — | — | — | — | — | X |
| Comparative example 4 | — | — | — | — | — | X |
| Comparative example 5 | ⊙2 | 4.4 | 5 | 4.5 | ⊙7 | X24 |
| Comparative example 6 | — | — | — | — | — | X0.043 |
| Comparative example 7 | — | — | — | — | — | X0.047 |
| Comparative example 8 | — | Dissolution | — | Dissolution | — | X27 |
| Comparative example 9 | ⊙7 | 0.076 | 25 | 0.082 | X34 | X23 |
| Comparative example 10 | — | Peeling | — | Peeling | — | X12 |

"—" shows not measured, or unmeasurable.

Since the pastes of Examples 1 to 17 contained the alkoxy-alkylated polyamide and the glycol, in all of them, curing was attained at 150° C. within 1 hour, and a thermal curing rate was high at a comparatively low temperature.

The pastes of Examples 1 to 17 had a good storage stability (6 months), and small reduction in performance at storage for a long time, and were excellent in an electrical conductivity. Examples 1 to 3, 5 and 7 to 15 that are pastes having further suitable composition ratios had a good storage stability (9 months), and small reduction in performance at storage for a longer time, and were more excellent in an electrical conductivity.

In particular, concerning electromagnetic-wave shielding properties, since the pastes of Examples 1 to 17 contained the alkoxy-alkylated polyamide and the glycol, electromagnetic-wave shielding properties of the paste film were significantly improved. The effect of such significant improvement in electromagnetic-wave shielding properties is apparent from comparison between assessment results (△ or higher) of electromagnetic-wave shielding properties of Examples 1 to 17, and assessment results (x) of electromagnetic-wave shielding properties of Comparative Examples 1 to 5 and 8 to 9 containing only one of the alkoxy-alkylated polyamide and the glycol.

In a preferable embodiment concerning electromagnetic-wave shielding properties, electromagnetic-wave shielding properties are improved by further satisfaction of the following conditions by pastes (in Examples 1 to 4, 6 to 16, assessment results of electromagnetic-wave shielding properties are ○ or ⊙).

(r1) The content of the alkoxy-alkylated polyamide based on 100 parts by mass of the nickel nanowires is 2 parts by mass or more (in particular, 2 to 40 parts by mass);

(r2) The paste contains glycol alkyl ether in an amount of 100 parts by mass or less (in particular, 0 to 100 parts by mass) based on 100 parts by mass of the glycol; That is, the paste may not contain glycol alkyl ether, or even if contains, an amount of glycol alkyl ether is at 100 parts by mass or less based on 100 parts by mass of the glycol.

In a more preferable embodiment concerning electromagnetic-wave shielding properties, electromagnetic-wave shielding properties are much more improved by further satisfaction of the following conditions of pastes (In Examples 2 to 4, 9 to 12 and 14, assessment results of electromagnetic-wave shielding properties are ⊙).

(s1) An average length of the nickel nanowires is 15 μm or more (in particular, 15 to 40 μm);

(s2) The content of the alkoxy-alkylated polyamide is 2 parts by mass or more based on 100 parts by mass of the nickel nanowires, and 5% by mass or less based on the total amount of the paste;

(s3) The paste further contains glycol alkyl ether in an amount of 5 to 50 parts by mass based on 100 parts by mass of the glycol;

(s4) The content of the glycol is 60 to 97.5% by mass based on the total amount of the paste.

Since in Comparative Examples 1 to 4, the alkoxy-alkylated polyamide was not used, and the epoxy resin was used, a dry thermal curing property was inferior. In Comparative Example 9, a ratio of the epoxy resin was increased, but a storage stability, a bending property, an alcohol-resisting property and electromagnetic-wave shielding properties were inferior.

In Comparative Example 5, the glycol was not used, and the paste was inferior in an electrical conductivity, a storage stability, and electromagnetic-wave shielding properties.

In Comparative Examples 6 and 7, nickel particles were used as an electrical conductive material, and the paste had no electrical conductivity. For this reason, electromagnetic-wave shielding properties were inferior.

Since in Comparative Example 8, polyvinylpyrrolidone that dissolves in the glycol was used, the paste was a paste inferior in a water-resisting property, a salt water-resisting property, an alcohol-resisting property and electromagnetic-wave shielding properties.

In Comparative Example 10, the paste contained only the nickel nanowires and the glycol, and was inferior in a bending property, a water-resisting property, a salt water-resisting property, and an alcohol-resisting property, and since there were many cracks and gaps, the paste was inferior in electromagnetic-wave shielding properties.

INDUSTRIAL APPLICABILITY

Since the paste of the present invention can afford a cured structure excellent in strength properties (in particular, a bending property), a heat-resisting property, a water-resisting property, a salt water-resisting property, an alcohol-resisting property and electromagnetic-wave shielding properties, and moreover, can be applied or bonded on a flexible substrate lacking in a heat-resisting property, it can be suitably applied to a stretchable circuit such as a wearable device, MID (Molding Interconnected Device), electromagnetic-wave shielding etc.

The paste of the present invention is also useful as a filling material that fills gaps for drawing out a wiring of electronic equipment etc.

The invention claimed is:

1. A paste comprising nickel nanowires, an alkoxy-alkylated polyamide and a glycol.

2. The paste of claim 1, wherein a content of the nickel nanowires is 1 to 50% by mass based on a total amount of the paste.

3. The paste of claim 1, wherein an average length of the nickel nanowires is 5 to 40 μm.

4. The paste of claim 1, wherein the alkoxy-alkylated polyamide is a polyamide in which hydrogen atoms of at least a part of amide groups are substituted with an alkyl group having an alkoxy group,
a carbon atom number of the alkoxy group is 1 to 5, and
a carbon atom number of the alkyl group is 1 to 5.

5. The paste of claim 1, wherein a content of the alkoxy-alkylated polyamide is 1 part by mass or more based on 100 parts by mass of the nickel nanowires.

6. The paste of claim 1, wherein a content of the alkoxy-alkylated polyamide is 10% by mass or less based on the total amount of the paste.

7. The paste of claim 1, wherein the glycol is selected from the group consisting of ethylene glycol, propylene glycol, trimethylene glycol, diethylene glycol, dipropylene glycol, triethylene glycol and tripropylene glycol.

8. The paste of claim 1, wherein a content of the glycol is 40 to 98.9% by mass based on the total amount of the paste.

9. The paste of claim 1, further comprising an acid catalyst.

10. The paste of claim 9, wherein the acid catalyst is oxalic acid.

11. The paste of claim 9, wherein a content of the acid catalyst is 1 to 10 parts by mass based on 100 parts by mass of the alkoxy-alkylated polyamide.

12. The paste of claim 1, further comprising glycol alkyl ether.

13. The paste of claim 12, wherein the glycol alkyl ether is one or more glycol derivatives selected from the group consisting of glycol derivatives in which at least one hydroxy group of two hydroxy groups of ethylene glycol or propylene glycol is alkyl-etherized, and
an alkyl group of the alkyl ether is an alkyl group having 1 to 5 carbon atoms.

14. The paste of claim 12, wherein a content of the glycol alkyl ether is 1 to 150 parts by mass based on 100 parts by mass of the glycol.

15. A structure that is obtained by curing the paste according to claim 1 at 130 to 160° C.

* * * * *